(12) United States Patent
Tung et al.

(10) Patent No.: US 7,924,494 B2
(45) Date of Patent: *Apr. 12, 2011

(54) APPARATUS AND METHOD FOR REDUCING SLIPPAGE BETWEEN STRUCTURES IN AN INTERFEROMETRIC MODULATOR

(75) Inventors: Ming-Hau Tung, San Francisco, CA (US); Brian W. Arbuckle, Danville, CA (US); Philip Don Floyd, Redwood City, CA (US); William Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,576

(22) Filed: Dec. 4, 2009

(65) Prior Publication Data
US 2010/0085626 A1 Apr. 8, 2010

Related U.S. Application Data

(63) Continuation of application No. 11/203,613, filed on Aug. 12, 2005, now Pat. No. 7,630,119.

(60) Provisional application No. 60/613,499, filed on Sep. 27, 2004.

(51) Int. Cl.
*G02B 26/00* (2006.01)
(52) U.S. Cl. .................................. 359/290; 359/291
(58) Field of Classification Search .......... 359/290, 359/291
See application file for complete search history.

(56) References Cited

U.S. PATENT DOCUMENTS

| | | | |
|---|---|---|---|
| 2,677,714 A | 5/1954 | Auwarter | |
| 3,247,392 A | 4/1966 | Thelen | |
| 3,728,030 A | 4/1973 | Hawes | |
| 3,886,310 A | 5/1975 | Guldberg | |
| 3,955,190 A | 5/1976 | Teraishi | |
| 4,403,248 A | 9/1983 | te Velde | |
| 4,421,381 A | 12/1983 | Ueda et al. | |
| 4,441,789 A | 4/1984 | Pohlack | |
| 4,441,791 A | 4/1984 | Hornbeck | |

(Continued)

FOREIGN PATENT DOCUMENTS

EP 0 668 490 8/1995

(Continued)

OTHER PUBLICATIONS

Aratani K., et al., "Surface micromachined tuneable interferometer array," Sensors and Actuators, pp. 17-23. (1994).

(Continued)

*Primary Examiner* — Jordan M. Schwartz
*Assistant Examiner* — James C Jones
(74) *Attorney, Agent, or Firm* — Knobbe Martens Olson & Bear LLP

(57) ABSTRACT

A support structure within an interferometric modulator device may contact various other structures within the device. Increased bond strengths between the support structure and the other structures may be achieved in various ways, such as by providing roughened surfaces and/or adhesive materials at the interfaces between the support structures and the other structures. In an embodiment, increased adhesion is achieved between a support structure and a substrate layer. In another embodiment, increased adhesion is achieved between a support structure and a moveable layer. Increased adhesion may reduce undesirable slippage between the support structures and the other structures to which they are attached within the interferometric modulator.

31 Claims, 11 Drawing Sheets

U.S. PATENT DOCUMENTS

| | | |
|---|---|---|
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,779,959 A | 10/1988 | Saunders |
| 4,786,128 A | 11/1988 | Birnbach |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zayhowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,535,526 A | 7/1996 | White |
| 5,559,358 A | 9/1996 | Burns et al. |
| 5,561,523 A | 10/1996 | Blomberg et al. |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goosen |
| 5,719,068 A | 2/1998 | Suzawa et al. |
| 5,734,177 A | 3/1998 | Sakamoto |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 5,986,796 A | 11/1999 | Miles |
| 6,028,689 A | 2/2000 | Michalicek et al. |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,195,196 B1 | 2/2001 | Kimura et al. |
| 6,242,932 B1 | 6/2001 | Hembree |
| 6,262,697 B1 | 7/2001 | Stephenson |
| 6,297,072 B1 | 10/2001 | Tilmans et al. |
| 6,327,071 B1 | 12/2001 | Kimura |
| 6,335,235 B1 | 1/2002 | Bhakta et al. |
| 6,351,329 B1 | 2/2002 | Greywall |
| 6,356,378 B1 | 3/2002 | Huibers |
| 6,377,233 B2 | 4/2002 | Colgan et al. |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,768,555 B2 | 7/2004 | Chen et al. |
| 6,794,119 B2 | 9/2004 | Miles |
| 6,813,059 B2 | 11/2004 | Hunter et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 6,983,820 B2 | 1/2006 | Boast et al. |
| 7,006,272 B2 | 2/2006 | Tsai |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,198,873 B2 | 4/2007 | Geh et al. |
| 7,221,495 B2 | 5/2007 | Miles et al. |
| 7,236,284 B2 | 6/2007 | Miles |
| 7,245,285 B2 | 7/2007 | Yeh et al. |
| 7,372,619 B2 | 5/2008 | Miles |
| 7,459,402 B2 | 12/2008 | Doan et al. |
| 7,460,291 B2 | 12/2008 | Sampsell et al. |
| 7,476,327 B2 | 1/2009 | Tung et al. |
| 7,508,566 B2 | 3/2009 | Feenstra et al. |
| 7,532,377 B2 | 5/2009 | Miles |
| 7,554,711 B2 | 6/2009 | Miles |
| 7,852,544 B2 | 12/2010 | Sampsell |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0024711 A1 | 2/2002 | Miles |
| 2002/0054422 A1 | 5/2002 | Carr et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0016428 A1 | 1/2003 | Kato et al. |
| 2003/0021004 A1 | 1/2003 | Cunningham et al. |
| 2003/0035196 A1 | 2/2003 | Walker |
| 2003/0043157 A1 | 3/2003 | Miles |
| 2003/0053078 A1 | 3/2003 | Missey et al. |
| 2003/0053233 A1 | 3/2003 | Felton |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |

| | | | | | | |
|---|---|---|---|---|---|---|
| 2004/0125281 | A1 | 7/2004 | Lin et al. | JP | 2001 249283 | 9/2001 |
| 2004/0125282 | A1 | 7/2004 | Lin et al. | JP | 2002-221678 | 8/2002 |
| 2004/0145811 | A1 | 7/2004 | Lin et al. | JP | 2003-340795 | 2/2003 |
| 2004/0147198 | A1 | 7/2004 | Lin et al. | JP | 2004-012642 | 1/2004 |
| 2004/0175577 | A1 | 9/2004 | Lin et al. | JP | 2004-212638 | 7/2004 |
| 2004/0184134 | A1 | 9/2004 | Makigaki | JP | 2004-212680 | 7/2004 |
| 2004/0188599 | A1 | 9/2004 | Viktorovitch et al. | JP | 2005 279831 | 10/2005 |
| 2004/0207897 | A1 | 10/2004 | Lin | JP | 2005-308871 | 11/2005 |
| 2004/0209195 | A1 | 10/2004 | Lin | WO | WO 98/14804 | 4/1998 |
| 2004/0217919 | A1 | 11/2004 | Piehl et al. | WO | WO 02/086582 | 10/2002 |
| 2004/0218251 | A1 | 11/2004 | Piehl et al. | WO | WO 03/069413 | 8/2003 |
| 2004/0240032 | A1 | 12/2004 | Miles | WO | WO 03/105198 | 12/2003 |
| 2004/0259010 | A1 | 12/2004 | Kanbe | | | |
| 2005/0002082 | A1 | 1/2005 | Miles | | | |
| 2005/0003667 | A1 | 1/2005 | Lin et al. | | | |
| 2005/0024557 | A1 | 2/2005 | Lin | | | |
| 2005/0035699 | A1 | 2/2005 | Tsai | | | |
| 2005/0036095 | A1 | 2/2005 | Yeh et al. | | | |
| 2005/0046919 | A1 | 3/2005 | Taguchi et al. | | | |
| 2005/0046922 | A1 | 3/2005 | Lin et al. | | | |
| 2005/0046948 | A1 | 3/2005 | Lin | | | |
| 2005/0068627 | A1 | 3/2005 | Nakamura et al. | | | |
| 2005/0078348 | A1 | 4/2005 | Lin | | | |
| 2005/0117623 | A1 | 6/2005 | Shchukin et al. | | | |
| 2005/0168849 | A1 | 8/2005 | Lin | | | |
| 2005/0179378 | A1 | 8/2005 | Oooka et al. | | | |
| 2005/0195462 | A1 | 9/2005 | Lin | | | |
| 2005/0275930 | A1 | 12/2005 | Patel et al. | | | |
| 2006/0007517 | A1 | 1/2006 | Tsai | | | |
| 2006/0017379 | A1 | 1/2006 | Su et al. | | | |
| 2006/0017689 | A1 | 1/2006 | Faase et al. | | | |
| 2006/0056000 | A1 | 3/2006 | Mignard | | | |
| 2006/0066926 | A1 | 3/2006 | Kwak et al. | | | |
| 2006/0082863 | A1 | 4/2006 | Piehl et al. | | | |
| 2006/0220160 | A1 | 10/2006 | Miles | | | |
| 2006/0262126 | A1 | 11/2006 | Miles | | | |
| 2007/0020948 | A1 | 1/2007 | Piehl et al. | | | |
| 2007/0153860 | A1 | 7/2007 | Chang-Hasnain et al. | | | |
| 2007/0177247 | A1 | 8/2007 | Miles | | | |
| 2007/0253054 | A1 | 11/2007 | Miles | | | |
| 2008/0037093 | A1 | 2/2008 | Miles | | | |
| 2008/0088904 | A1 | 4/2008 | Miles | | | |
| 2008/0088910 | A1 | 4/2008 | Miles | | | |
| 2008/0088911 | A1 | 4/2008 | Miles | | | |
| 2008/0088912 | A1 | 4/2008 | Miles | | | |
| 2008/0106782 | A1 | 5/2008 | Miles | | | |
| 2008/0297880 | A1* | 12/2008 | Steckl et al. ............ 359/291 | | | |
| 2009/0068781 | A1 | 3/2009 | Tung et al. | | | |
| 2009/0080060 | A1 | 3/2009 | Sampsell et al. | | | |
| 2010/0039370 | A1 | 2/2010 | Miles | | | |

FOREIGN PATENT DOCUMENTS

| | | |
|---|---|---|
| EP | 1 122 577 | 8/2001 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 473 691 | 11/2004 |
| JP | 5-49238 | 2/1993 |
| JP | 5-281479 | 10/1993 |
| JP | 11211999 | 8/1999 |
| JP | 2002-062490 | 2/2000 |
| JP | 2001-221913 | 8/2001 |

OTHER PUBLICATIONS

Conner, "Hybrid Color Display Using Optical Interference Filter Array," SID Digest, pp. 577-580 (1993).
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Intl. Conf. on Solid State Sensors and Actuators, vol. CONF. 6, Jun. 24, 1991, pp. 372-375.
Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.
Miles, A New Reflective FPD Technology Using Interferometric Modulation, Journal of the SID, 5/4, 1997.
Miles, Interferometric modulation: MOEMS as an enabling technology for high performance reflective displays, Proceedings of SPIE, vol. 4985, pp. 131-139, 2003.
Pape et al., Characteristics of the deformable mirror device for optical information processing, Optical Engineering, 22(6):676-681, Nov.-Dec. 1983.
Office Action dated Aug. 6, 2008 in U.S. Appl. No. 11/961,744.
Office Action received Jun. 13, 2008 in Chinese App. No. 200580030992.1.
ISR and WO PCT/US05/030962 dated Jan. 19, 2006.
ISR and WO PCT/US05/034465 dated Jan. 19, 2001.
IPRP for PCT/US05/034465 dated Apr. 5, 2007.
Goosen, "MEMS-based variable optical interference devices," Optical MEMS, 2000 IEEE/LEDS Int'l. Conf. on Aug. 21-24, 2000, Piscatawny, NJ, Aug. 21, 2000, pp. 17-18.
Longhurst, 1963, Chapter IX: Multiple Beam Interferometry, in Geometrical and Physical Optics, pp. 153-157.
Tolansky, 1948, Chapter II: Multiple-Beam Interference, in Multiple-bean Interferometry of Surfaces and Films, Oxford at the Clarendon Press, pp. 8-11.
Office Action mailed Jun. 1, 2007 in U.S. Appl. No. 11/203,613.
Office Action mailed Nov. 5, 2007 in U.S. Appl. No. 11/203,613.
Office Action mailed Mar. 28, 2008 in U.S. Appl. No. 11/203,613.
Office Action mailed Nov. 20, 2008 in U.S. Appl. No. 11/203,613.
IPRP for PCT/US05/030962 dated Apr. 5, 2007.
Nakagawa et al., Feb. 1, 2002, Wide-field-of-view narrow-band spectral filters based on photonic crystal nanocavities, Optics Letters, 27(3):191-193.
Office Action dated Jul. 14, 2010 in U.S. Appl. No. 12/631,194.

* cited by examiner

|  | Column Output Signals | |
|---|---|---|
|  | $+V_{bias}$ | $-V_{bias}$ |
| Row Output Signals: 0 | Stable | Stable |
| $+\Delta V$ | Relax | Actuate |
| $-\Delta V$ | Actuate | Relax |

APPARATUS AND METHOD FOR REDUCING SLIPPAGE BETWEEN STRUCTURES IN AN INTERFEROMETRIC MODULATOR

CROSS-REFERENCE TO RELATED APPLICATIONS

This application is a continuation of U.S. patent application Ser. No. 11/203,613, filed Aug. 12, 2005, which claims the benefit of U.S. Provisional Application No. 60/613,499, filed Sep. 27, 2004, the disclosure of each of which is hereby incorporated by reference in its entirety.

BACKGROUND

1. Field of the Invention

This invention relates to microelectromechanical systems for use as interferometric modulators. More particularly, this invention relates to systems and methods for improving the micro-electromechanical operation of interferometric modulators.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides an interferometric modulator that includes a substrate layer and a moveable layer. The substrate layer includes a first reflective surface and the moveable layer includes a second reflective surface. The second reflective surface is spaced from the first reflective surface to thereby define a cavity. The interferometric modulator further includes a support structure positioned at a side of the cavity between the substrate layer and the moveable layer, and a bond between the support structure and at least one of the substrate layer and the moveable layer. The bond may be configured to increase adhesion between the support structure and at least one of the substrate layer and the moveable layer. Another embodiment provides a display device that includes such an interferometric modulator.

Another embodiment provides an interferometric modulator that includes a means for supporting a moveable layer over a fixed layer, and a means for bonding the support means to at least one of the fixed layer and the moveable layer. The bonding means may be configured to provide improved adhesion between the support means and at least one of the fixed layer and the moveable layer. The bonding means may include, for example, an adhesive and/or a roughened interface between the support means and at least one of the fixed layer and the moveable layer.

Another embodiment provides a method of making an interferometric modulator that includes forming a substrate layer, the substrate layer comprising a first reflective surface, and treating at least a portion of a support region of the substrate layer to form a treated support region. The method further includes forming a support structure on the treated support region. The treated support region may be configured to increase adhesion between the substrate layer and the support structure. Another embodiment provides an interferometric modulator made by such a method.

Another embodiment provides a method of making an interferometric modulator that includes forming a substrate layer and forming a support structure on the substrate layer. The method further includes treating the support structure to form a treated support structure and forming a moveable layer on the treated support structure. Another embodiment provides an interferometric modulator made by such a method.

These and other embodiments are described in greater detail below.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An embodiment provides increased bond strengths between post structures and other structures (such as the substrate and/or the moveable layer) in an interferometric modulator. In certain embodiments, the increased bond strengths are achieved by providing a roughened surface and/or an adhesive layer at the interface between the post structure and the structures to which it is attached (such as the substrate and/or the moveable layer).

Figure 1:
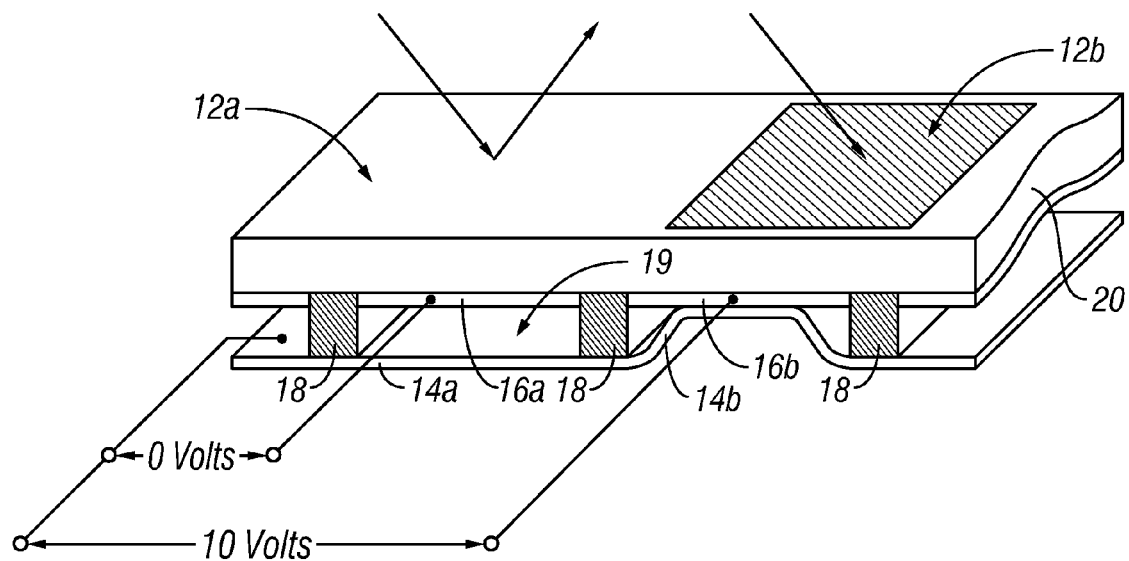
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
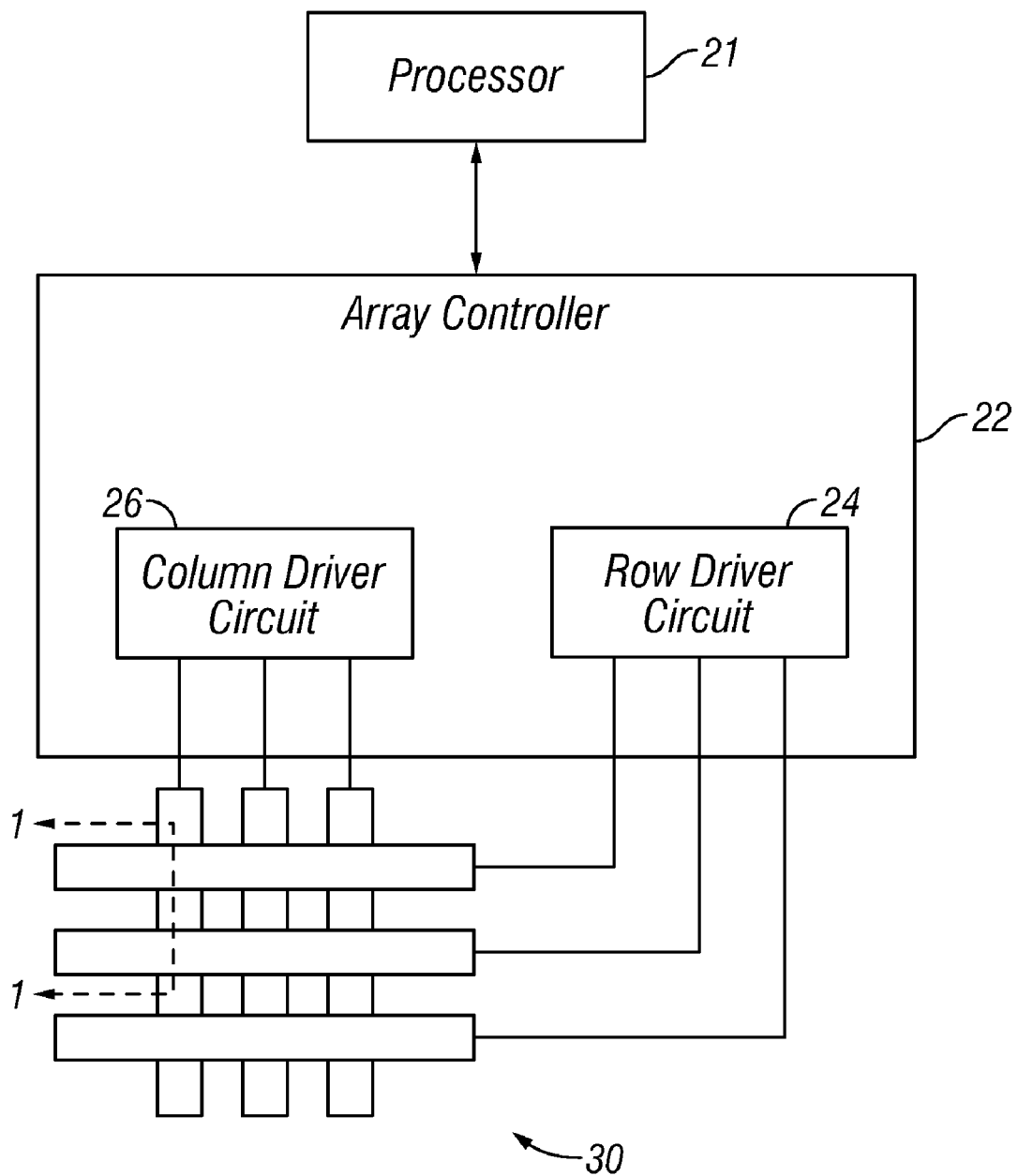
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
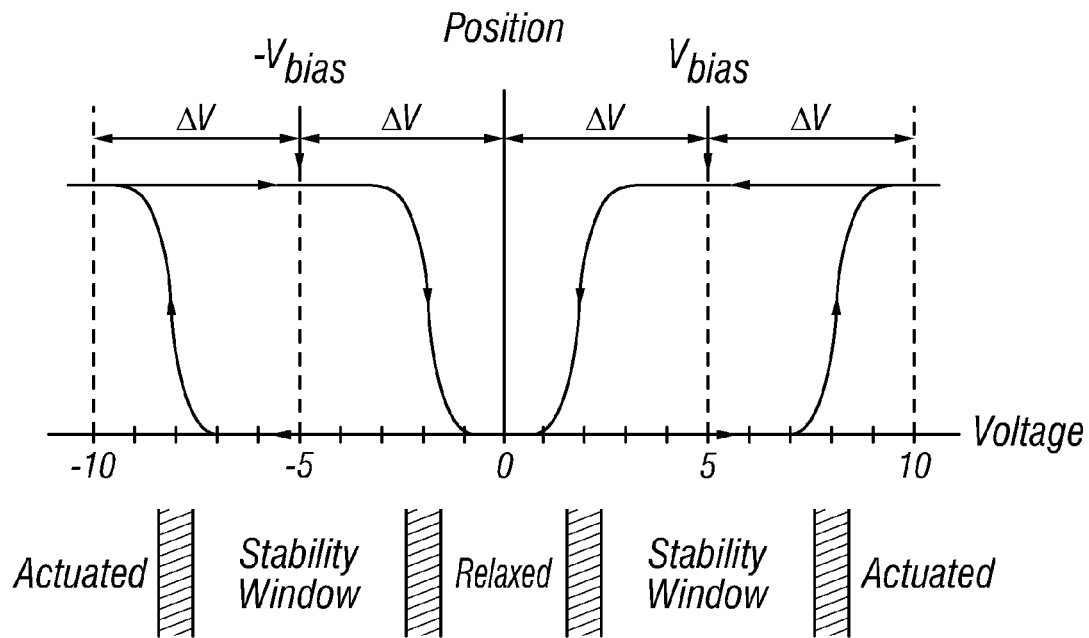
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
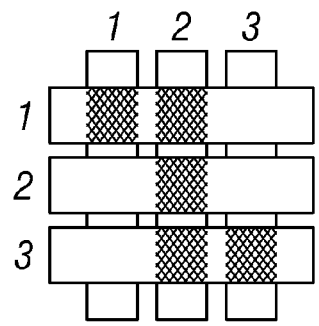
FIGS. 5A and 5B illustrate one exemplary timing diagram for row and column signals that may be used to write a frame of display data to the 3×3 interferometric modulator display of FIG. 2.
Figure 5B:
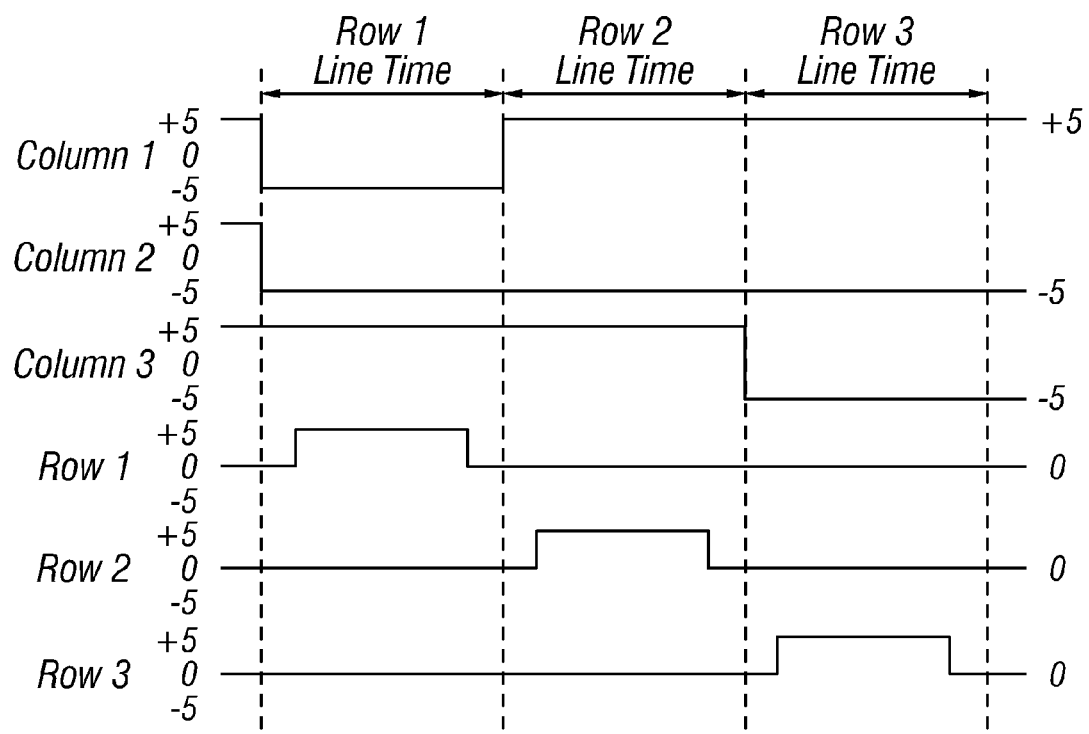

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
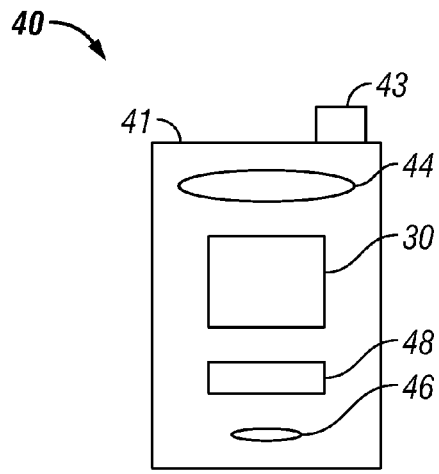
FIGS. 6A and 6B are system block diagrams illustrating an embodiment of a visual display device comprising a plurality of interferometric modulators.
Figure 6B:
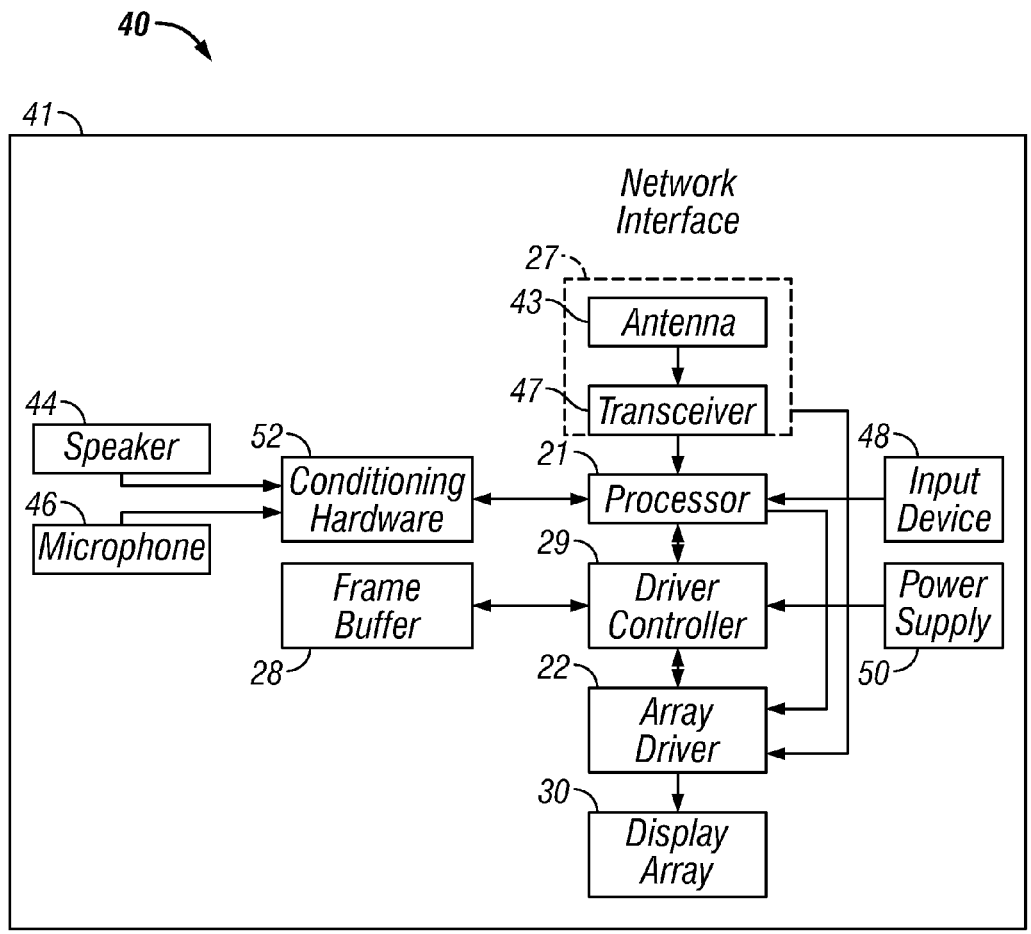

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
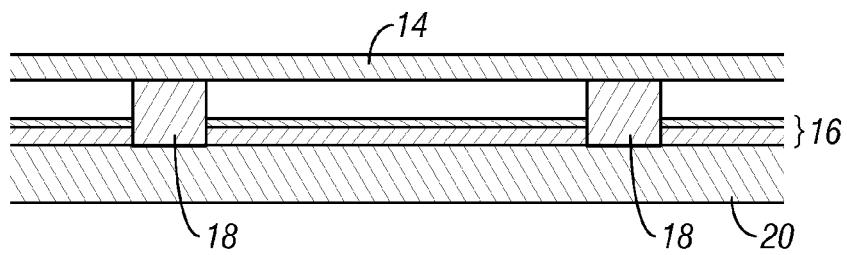
FIG. 7A is a cross section of the device of FIG. 1.
Figure 7B:
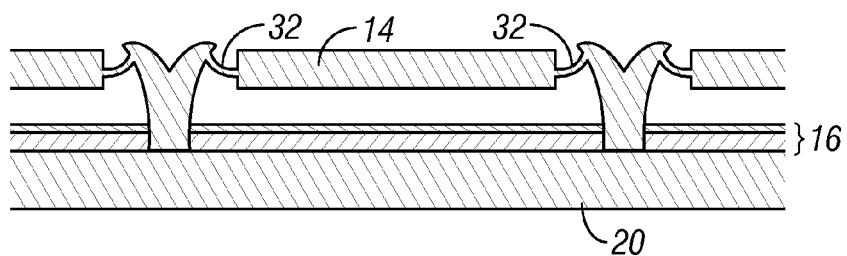
FIG. 7B is a cross section of an alternative embodiment of an interferometric modulator.
Figure 7C:
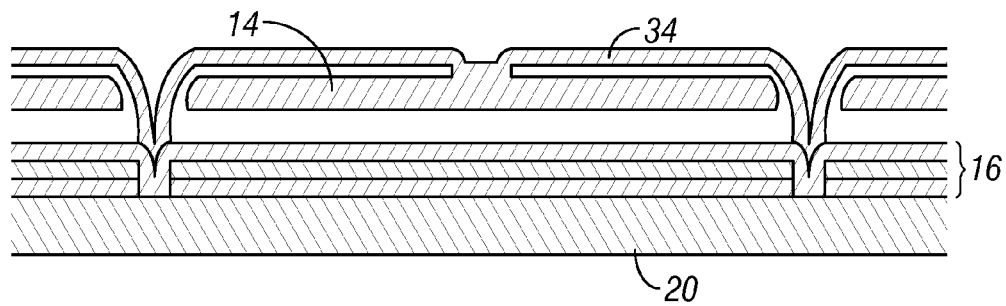
FIG. 7C is a cross section of another alternative embodiment of an interferometric modulator.
Figure 7D:
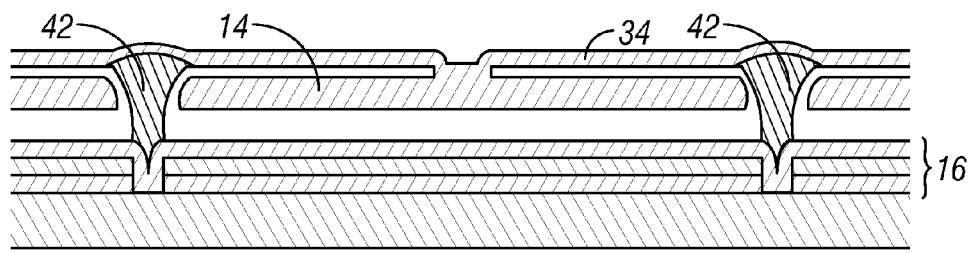
FIG. 7D is a cross section of yet another alternative embodiment of an interferometric modulator.
Figure 7E:
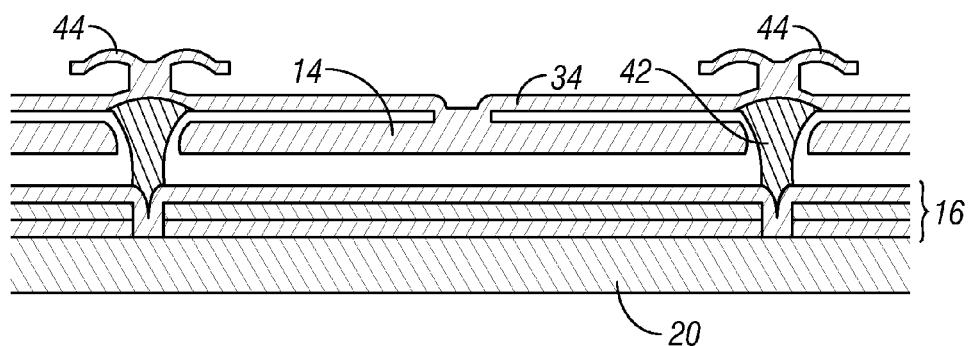
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
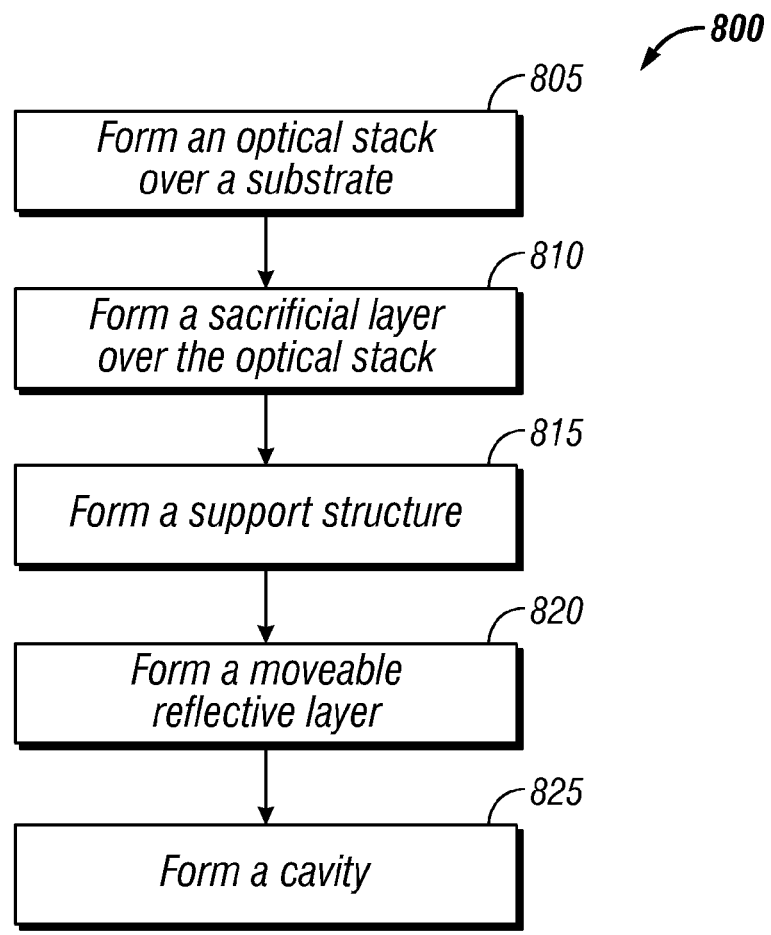
FIG. 8 is a flow diagram illustrating certain steps in an embodiment of a method of making an interferometric modulator.

FIG. 8 illustrates certain steps in an embodiment of a manufacturing process 800 for a MEMS, e.g., an interferometric modulator. Such steps may be present in a process for manufacturing, e.g., interferometric modulators of the general type illustrated in FIGS. 1 and 7, along with other steps not shown in FIG. 8. With reference to FIGS. 1, 7 and 8, the process 800 begins at step 805 with the formation of the optical stack 16 over the substrate 20. The substrate 20 may be a transparent substrate such as glass or plastic and may have been subjected to prior preparation step(s), e.g., cleaning, to facilitate efficient formation of the optical stack 16. The optical stack 16 may be formed by employing one or more deposition steps, e.g., conductive layer (e.g., indium tin oxide) deposition, reflective layer (e.g., chromium) deposition, and dielectric layer deposition, along with one or more patterning, masking, and/or etching steps.

The process 800 illustrated in FIG. 8 continues at step 810 with the formation of a sacrificial layer over the optical stack 16. The sacrificial layer is later removed (e.g., at step 825) to form the cavity 19 as discussed below and thus the sacrificial layer is not shown in the resulting interferometric modulator 12 illustrated in FIGS. 1 and 7. The formation of the sacrificial layer over the optical stack 16 may include deposition of a material such as molybdenum or amorphous silicon, in a thickness selected to provide, after subsequent removal, a cavity 19 having the desired size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

The process 800 illustrated in FIG. 8 continues at step 815 with the formation of a support structure e.g., a post 18 as illustrated in FIGS. 1 and 7. The formation of the post 18 may include the steps of patterning the sacrificial layer to form an aperture, then depositing a material (e.g., a polymer, metal or oxide) into the aperture to form the post 18, using a deposition method such as PECVD, thermal CVD, or spin-coating. In some embodiments, the aperture formed in the sacrificial layer extends through both the sacrificial layer and the optical stack 16 to the underlying substrate 20, so that the lower end of the post 18 contacts the substrate 20 as illustrated in FIG. 7A. In other embodiments, the aperture formed in the sacrificial layer extends through the sacrificial layer, but not through the optical stack 16. For example, FIG. 7C illustrates the lower end of the support post plugs 42 in contact with the optical stack 16.

The process 800 illustrated in FIG. 8 continues at step 820 with the formation of a moveable reflective layer such as the moveable reflective layer 14 illustrated in FIGS. 1 and 7. The moveable reflective layer 14 may be formed by employing one or more deposition steps, e.g., reflective layer (e.g., aluminum, aluminum alloy) deposition, along with one or more patterning, masking, and/or etching steps.

The process 800 illustrated in FIG. 8 continues at step 825 with the formation of a cavity, e.g., a cavity 19 as illustrated in FIGS. 1 and 7. The cavity 19 may be formed by exposing the sacrificial material (deposited at step 810) to a selective etchant. For example, a sacrificial material such as molybdenum or amorphous silicon may be removed by dry chemical etching, e.g., by exposing the sacrificial layer to a gaseous or vaporous etchant such as xenon difluoride ($XeF_2$) for a period of time that is effective to remove the desired amount of material. Other etching methods, e.g. wet etching and/or plasma etching, may be also be used.

Interferometric modulators may be manufactured in accordance with various sets of processing parameters, and thus it will be understood that FIG. 8 shows only a few of the more common steps for the purposes of illustration. It will be also be understood that not all processes for manufacturing interferometric modulators include all the steps illustrated in FIG. 8; that the steps illustrated in FIG. 8 need not necessarily be carried out in the order shown, and that various additional manufacturing steps may be carried out, e.g., testing, backend processing, and incorporating the interferometric modulator into a display device 40 as illustrated in FIG. 6.

Figure 9:
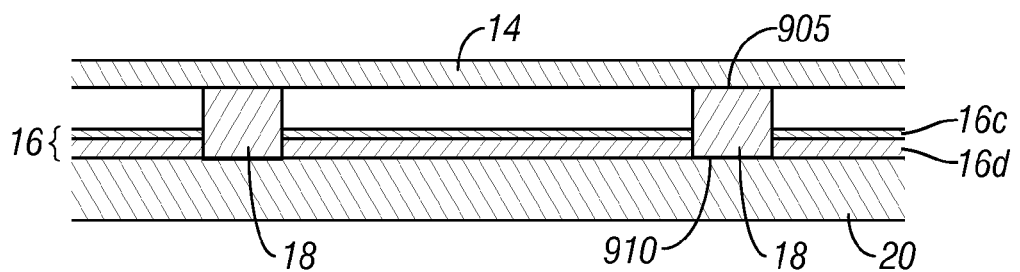
FIG. 9 is a cross section of an embodiment of an interferometric modulator.

FIG. 9 illustrates a cross-sectional view of an embodiment of an interferometric modulator. In this embodiment, the support structure 18 interacts with the moveable reflective layer 14 at an interface 905 between the upper end of the support structure 18 and the lower surface of the layer 14. Likewise, the support structure 18 interacts with the substrate 20 at an interface 910 between the lower end of the support 18 and the upper surface of the substrate 20. In certain situations, sliding or slippage between the support 18 and one or both of the moveable reflective layer 14 and the substrate 20 may occur. It has now been found that this movement may be decreased or eliminated in a number of ways. For example, in one embodiment, the movement is decreased by forming a bond at one or both of the interfaces 905, 910. The bond is preferably configured to increase adhesion between the support structure 18 and at least one of the substrate layer 20 and the moveable layer 14. The increased adhesion may provide other benefits, instead of or in addition to decreasing and/or preventing relative movement between the support structure 18 and the layer(s) with which it is in contact.

Figure 10A:
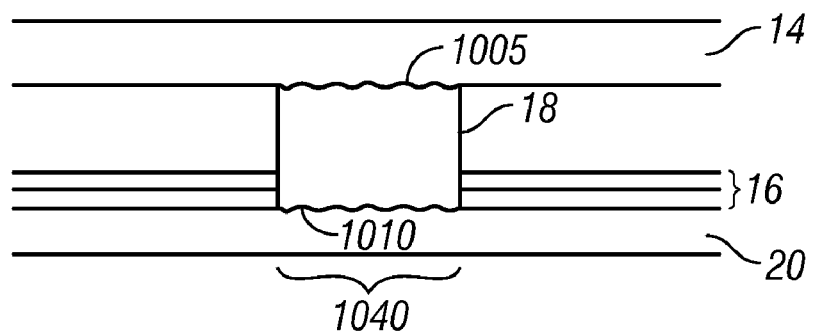
FIGS. 10A-10E are partial cross sections of an embodiment of an interferometric modulator illustrating bonds to a post structure.

FIG. 10A illustrates an embodiment of a bond 1005 formed at the interface between the upper end of the support structure 18 and the lower surface of the moveable layer 14, and a bond 1010 at the interface between the lower end of the support structure 18 and the upper surface of a transparent substrate layer 20. In the illustrated embodiment, the bonds 1005, 1010 both comprise a roughened interface between the support structure 18 and each of the moveable layer 14 and the substrate layer 20, respectively. This invention is not bound by theory, but it is believed that roughening increases the surface area at the interface and/or provides mechanical interlocking between the two surfaces, thereby increasing adhesion between the support structure 18 and each of the layers 14, 20. Adhesion tends to increase as the degree of roughness increases, and thus the degree of roughness for each of the bonds 1005, 1010 is preferably selected to provide the desired degree of adhesion, as determined by routine experimentation. The bond 1010 at the interface between the lower end of the support structure 18 and the upper surface of a transparent substrate layer 20 may be formed during fabrication of the interferometric modulator, preferably by roughening a region 1040 of the surface of the substrate 20 prior to formation of the support structure, as described in greater detail below. The bond 1005 at the interface between the upper end of the support structure 18 and the lower surface of the moveable layer 14 may also be formed during fabrication of the interferometric modulator, preferably by roughening the support structure prior to formation of the moveable layer 14, as described in greater detail below. Roughening of the substrate and/or support structure may be carried out in various ways, e.g., by etching techniques known to those skilled in the art. For example, the substrate may be etched by oxygen plasma burn down and/or by sputter etching. The degree of roughening for each of the bonds 1005, 1010, may be the same or different. In some embodiments (not shown in FIG. 10A), only one of the interfaces 905, 910 is treated to increase adhesion between the support structure 18 and the layers 14, 20, respectively.

Figure 10B:
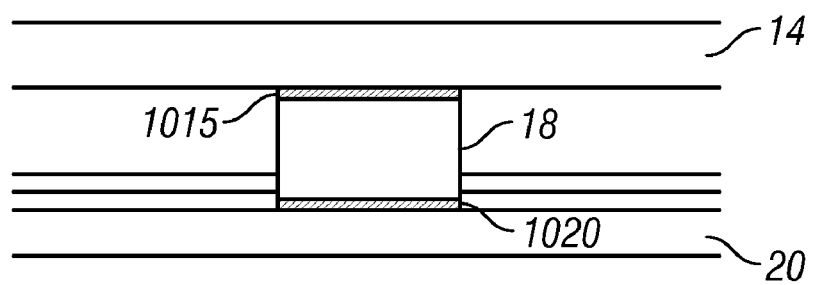

FIG. 10B illustrates an embodiment of a bond 1015 formed at the interface between the upper end of the support structure 18 and the lower surface of the moveable layer 14, and a bond 1020 at the interface between the lower end of the support structure 18 and the upper surface of a transparent substrate layer 20. In the illustrated embodiment, the bonds 1015, 1020 both comprise an adhesive layer between the support structure 18 and each of the moveable layer 14 and the substrate layer 20, respectively. The adhesive layer preferably comprises a material that adheres more strongly to both of the surfaces at the interface than either of the interfacial surfaces adhere to one another in the absence of the adhesive material. For example, the bond 1015 preferably comprises a material that adheres better to both the support structure 18 and the moveable layer 14, than the support structure 18 adheres to the moveable layer 14 in the absence of the bond 1015. Likewise, the bond 1020 preferably comprises a material that adheres better to both the support structure 18 and the substrate layer 20, than the support structure 18 adheres to the substrate layer 20 in the absence of the bond 1020. Adhesive materials may be selected by routine experimentation. Preferably, one or both of the adhesive bond 1015 and the adhesive bond 1020 comprise aluminum, e.g., the bonds 1015, 1020 contain aluminum or an aluminum alloy. The bond 1020 at the interface between the lower end of the support structure 18 and the upper surface of a transparent substrate layer 20 may be formed during fabrication of the interferometric modulator, preferably by depositing an adhesive material onto the substrate 20 prior to formation of the support structure, as described in greater detail below. Likewise, the bond 1015 at the interface between the upper end of the support structure 18 and the lower surface of the moveable layer 14 may also be formed during fabrication of the interferometric modulator, preferably by depositing an adhesive material onto the support structure prior to formation of the moveable layer 14, as described in greater detail below.

Figure 10C:
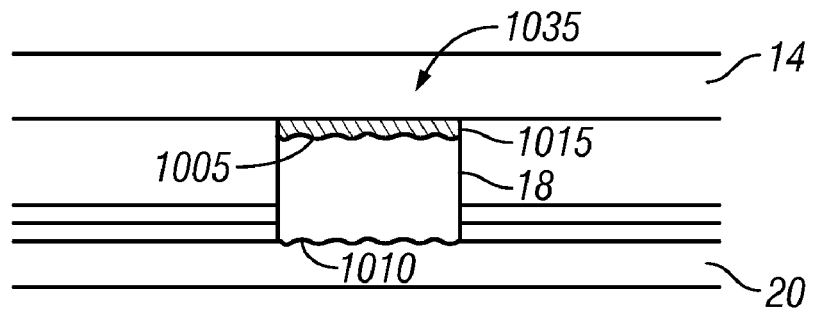

FIG. 10C illustrates that a bond between the support structure and at least one of the substrate layer and the moveable layer may comprise both a roughened interface and an adhesive layer. The bond 1035 between the upper end of the support structure 18 and the lower surface of the moveable layer 14 shown in FIG. 10C comprises a bond 1005 that comprises a roughened surface on the upper end of the support structure 18, and an adhesive layer 1015 between the roughened interface and the lower surface of the moveable layer 14. This invention is not bound by theory, but it is believed that the surface roughening increases the surface area of the upper end of the support structure 18 that is available for bonding, thus increasing adhesion between the upper end of the support structure 18 and the adhesive layer in the bond 1015. FIG. 10C also illustrates an interferometric modulator in which the upper end of the support structure 18 is bonded to the lower surface of the moveable layer 14 in a different manner (via the bond 1035) than the lower end of the support structure 18 is bonded to the upper surface of the substrate layer 20 (via a bond 1010 that comprises a roughened interface, without an adhesive layer).

Figure 10D:
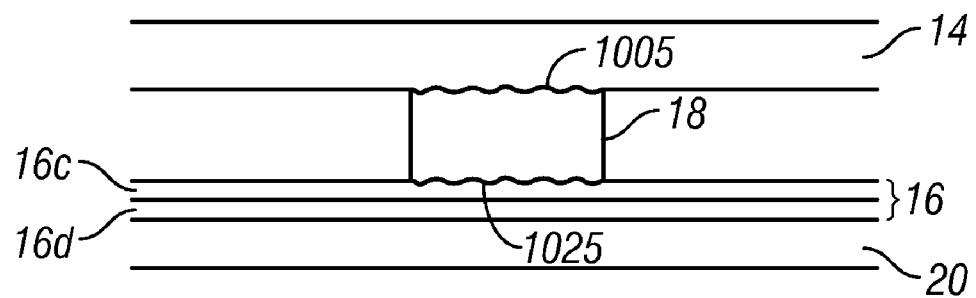
Figure 10E:
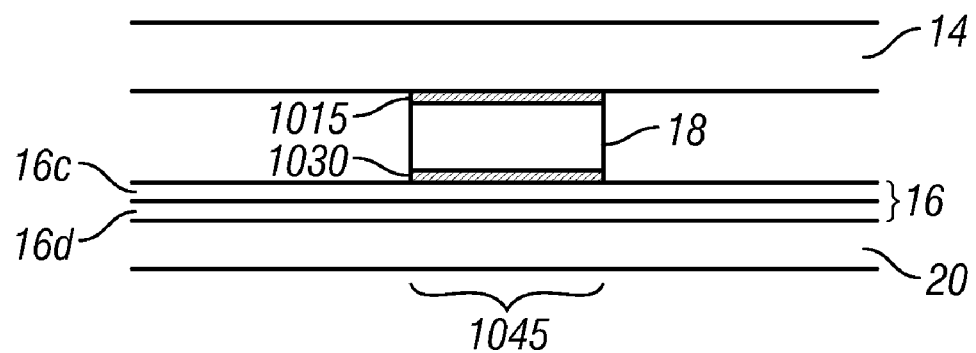

FIG. 10D illustrates an embodiment of a bond 1025 formed at the interface between the lower end of the support structure 18 and the upper surface of a transparent substrate layer 20, where the upper surface of the substrate 20 comprises an optical stack 16. In the illustrated embodiment, the bond 1015 is formed by roughening the optical stack 16, rather than the transparent substrate 20 as illustrated in FIG. 10A. Likewise, FIG. 10E illustrates an embodiment of a bond 1030 formed at the interface between the lower end of the support structure 18 and the upper surface of a transparent substrate layer 20, where the upper surface of the substrate 20 comprises an optical stack 16. In the illustrated embodiment, the bond 1030 is formed by depositing an adhesive layer onto the optical stack 16, rather than onto the transparent substrate 20 as illustrated in FIG. 10B.

The various bonds 1005, 1010, 1015, 1020, 1025, 1030 are illustrated in FIG. 10 for an interferometric modulator of the general type shown in FIG. 7A. It will be understood that similar bonds may be formed between the support structures and the layers to which the support structures are attached in other types of interferometric modulators, including but not limited to the interferometric modulators illustrated in FIGS. 7B-E. For example, in an embodiment (not illustrated in FIG. 10), a bond is formed between a support structure and a moveable layer, and a reflective surface is suspended from the moveable layer, e.g., in the general manner illustrated in FIG. 7C. It will also be appreciated that the support structure 18 (e.g., a post) is an example of a means for supporting a moveable layer (e.g., the moveable layer 14) over a fixed layer (e.g., the substrate layer 20 comprising the optical stack 16). It will also be appreciated that the bonds formed by surface roughening (e.g., the bonds 1005, 1010) and by the use of an adhesive layer (e.g., the bonds 1015, 1020) are examples of means for bonding the support means to at least one of the fixed layer and the moveable layer.

Figure 11:
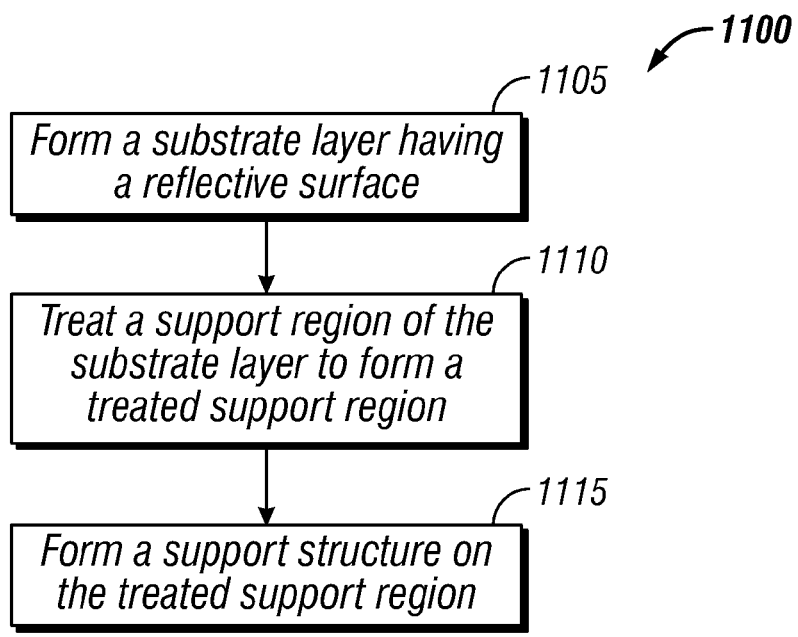
FIG. 11 is a flow diagram illustrating certain steps in an embodiment of a method of making an interferometric modulator.

FIG. 11 is a flow chart illustrating an embodiment of a method of making an interferometric modulator. The method 1100 begins at step 1105 by forming a substrate layer. Preferably, the substrate layer comprises a first reflective surface. The substrate layer may include a transparent substrate 20 and the first reflective surface may include an optical stack 16 as illustrated in FIGS. 1 and 7. The optical stack 16 may be formed on the substrate 20 by employing one or more deposition steps, e.g., reflective layer (e.g., chromium) deposition, conductive layer (e.g., indium tin oxide) deposition, and dielectric layer deposition, along with one or more patterning, masking, and/or etching steps.

The method 1100 continues at step 1110 by treating at least a portion of a support region of the substrate layer to form a treated support region. The support region of the substrate layer is typically the area that will underlie a support structure that will be formed in a subsequent step. The substrate layer may comprise the first reflective surface, and thus treatment of the support region of the substrate layer may include treatment of the support region of the substrate, e.g., treatment of the support region 1040 of the substrate 20 as illustrated in FIG. 10A, and/or treatment of the first reflective surface, e.g., the support region 1045 of the optical stack 16 as illustrated in FIG. 10. Treating the support region to form a treated support region may include, for example, roughening the support region and/or applying an adhesive layer. Thus, the resulting treated support region may include, for example, a roughened surface (such as the roughened surfaces included in the bonds 1010, 1025 illustrated in FIGS. 10A and 10D, respectively) and/or a adhesive layer such as the adhesive layers included in the bonds 1020, 1030 illustrated in FIGS. 10B and 10E, respectively. Treating the support region may include exposing the support region to a roughening treatment such as a wet chemical etch, a dry chemical etch, and/or a plasma etch. Examples of roughening treatments include oxygen plasma burn down and sputter etching. In addition to or instead of roughening, treating the support region may include depositing an adhesive layer by a deposition process such as, e.g., spin-on, PECVD, thermal CVD, and/or PVD (e.g., sputtering). In an embodiment, deposition of an adhesive layer comprises depositing a metal, wherein the metal comprises aluminum (e.g., an aluminum alloy). Treatment is preferably carried out to an extent that is effective to provide increased adhesion between the substrate layer and the subsequently-formed support structure, e.g., between the substrate 20 and the support structure 18 as illustrated in FIG. 10.

The method 1100 continues at step 1115 by forming a support structure on the treated support region. The support structure may be formed in various ways. For example, in an embodiment, a configuration such as that illustrated in FIGS. 10A and 10B may be fabricated by depositing a first reflective layer (e.g., the optical stack 16) and a sacrificial layer on a substrate (e.g., the substrate 20), forming an aperture (e.g., a hole) through the sacrificial layer and the first reflective layer to expose a portion of the underlying substrate (e.g., to expose the underlying substrate 20), treating the exposed substrate to form a treated support region (e.g., the treated support region 1040) as described above, and depositing a support structure material into the aperture to form a support structure (e.g., the support structure 18) in contact with the treated support region. In another embodiment, a configuration such as that illustrated in FIGS. 10D and 10E may be fabricated by depositing a first reflective layer (e.g., the optical stack 16) and a sacrificial layer on a substrate (e.g., the substrate 20), forming an aperture (e.g., a hole) through the sacrificial layer to expose a portion of the underlying first reflective layer (e.g., to expose the optical stack 16), treating the exposed optical stack 16 to form a treated support region (e.g., the treated support region 1045) as described above, and depositing a support structure material into the aperture to form a support structure (e.g., the support structure 18) in contact with the treated support region. The support structure may be formed in various ways, e.g., by spin-in deposition of a polymer or by chemical vapor deposition (e.g., PECVD or thermal CVD) of an oxide such as a silicon oxide.

It will be understood that additional steps (not illustrated in FIG. 11) in the fabrication of the interferometric modulator may also be conducted in accordance with the method 1100, e.g., deposition of the sacrificial layer over the substrate layer, deposition of a moveable layer over the sacrificial layer, deposition of a second reflective layer over the sacrificial layer, removal of the sacrificial layer to form a cavity positioned between the first reflective layer and the second reflective layer, and/or removal of the sacrificial layer to form a cavity positioned between the first reflective layer and the moveable layer.

Figure 12:
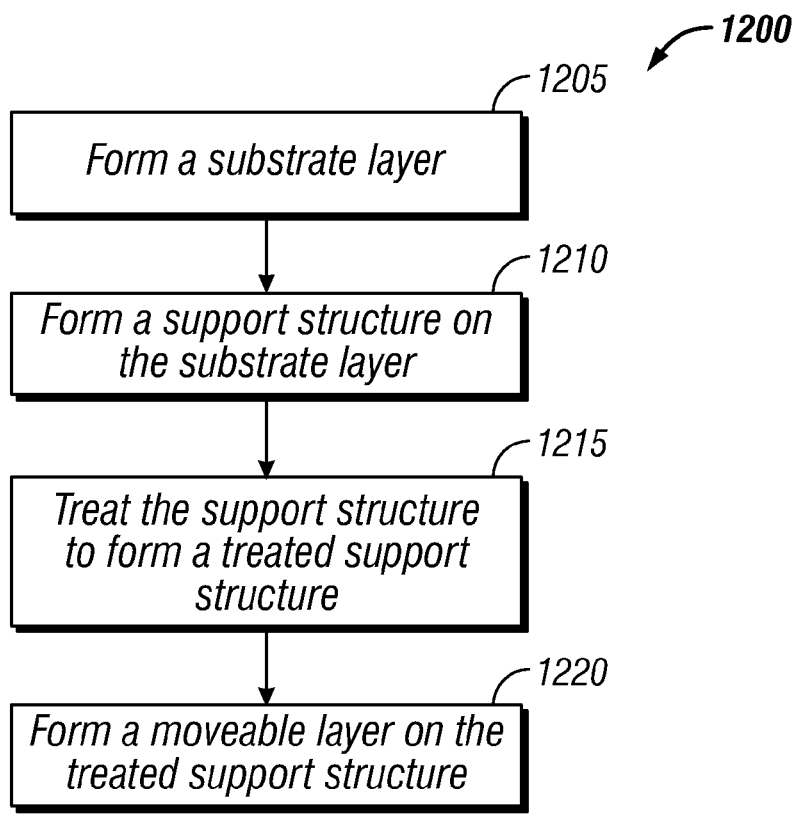
FIG. 12 is a flow diagram illustrating certain steps in an embodiment of a method of making an interferometric modulator.

FIG. 12 is a flow chart illustrating another embodiment of a method of making an interferometric modulator. The method 1200 begins at step 1205 by forming a substrate layer. Preferably, the substrate layer comprises a first reflective surface. The substrate layer may include a transparent substrate 20 and the first reflective surface may include an optical stack 16 as illustrated in FIGS. 1 and 7. The optical stack 16 may be formed on the substrate 20 by employing one or more deposition steps, e.g., reflective layer (e.g., chromium) deposition, conductive layer (e.g., indium tin oxide) deposition, and dielectric layer deposition, along with one or more patterning, masking, and/or etching steps.

The method 1200 continues at step 1210 by forming a support structure on the substrate layer. The support structure may be formed in various ways. For example, in an embodiment, a configuration such as that illustrated in FIGS. 10A and 10B may be fabricated by depositing a first reflective layer (e.g., the optical stack 16) and a sacrificial layer on a substrate (e.g., the substrate 20), forming an aperture (e.g., a hole) through the sacrificial layer and the first reflective layer to expose a portion of the underlying substrate (e.g., to expose the underlying substrate 20), and depositing a support structure material into the aperture to form a support structure (e.g., the support structure 18) in contact with the substrate (e.g., the substrate 20). Optionally, the exposed substrate may be treated to form a treated support region (e.g., the treated support region 1040) as described above. In another embodiment, a configuration such as that illustrated in FIGS. 10D and 10E may be fabricated by depositing a first reflective layer (e.g., the optical stack 16) and a sacrificial layer on a substrate (e.g., the substrate 20), forming an aperture (e.g., a hole) through the sacrificial layer to expose a portion of the underlying first reflective layer (e.g., to expose the optical stack 16), and depositing a support structure material into the aperture to form a support structure (e.g., the support structure 18) in contact with the first reflective layer (e.g., the optical stack 16). Optionally, the exposed optical stack 16 may be treated to form a treated support region (e.g., the treated support region 1045) as described above. The support structure may be formed in various ways as described above, e.g., by spin-in deposition of a polymer or by chemical vapor deposition (e.g., PECVD or thermal CVD) of an oxide such as a silicon oxide.

The method 1200 continues at step 1215 by treating the support structure to form a treated support structure. Preferably, the upper end of the support structure is treated to increase adhesion to a subsequently-formed moveable layer. Treating the support structure to form a treated support structure may include, for example, roughening the upper end of the support structure and/or applying an adhesive layer over the upper end of the support structure. Thus, the resulting treated support structure may include, for example, a roughened surface (such as the roughened surface included in the bond 1005 illustrated in FIG. 10A) and/or a adhesive layer such as the adhesive layer included in the bond 1015 illustrated in FIG. 10B. Treating the support structure may include exposing the support structure to a roughening treatment such as a wet chemical etch, a dry chemical etch, and/or a plasma etch. Examples of roughening treatments include oxygen plasma burn down and sputter etching. In addition to or instead of roughening, treating the support structure may include depositing an adhesive layer by a deposition process such as, e.g., spin-on, plasma-enhanced chemical vapor deposition (PECVD), thermal chemical vapor deposition (thermal CVD), and/or PVD. In an embodiment, deposition of an adhesive layer comprises depositing a metal, wherein the metal comprises aluminum (e.g., an aluminum alloy). Treatment is preferably carried out to an extent that is effective to provide increased adhesion between the support structure and the subsequently-formed moveable layer, e.g., between the support structure 18 and the moveable layer 14 as illustrated in FIG. 10.

The method 1200 continues at step 1220 by forming a moveable layer on the treated support structure. The moveable reflective layer (e.g., the layer 14 as illustrated in FIGS. 1 and 7) may be formed by employing one or more deposition steps, e.g., reflective layer (e.g., aluminum, aluminum alloy) deposition, along with one or more patterning, masking, and/or etching steps. In an embodiment, formation of the moveable layer on a roughened surface at the upper end of the support structure forms a bond, e.g., the bond 1005 as illustrated in FIG. 10. In another embodiment, formation of the moveable layer on an adhesive layer at the upper end of the support structure forms a bond, e.g., the bonds 1015, 1035 as illustrated in FIG. 10.

It will be understood that additional steps (not illustrated in FIG. 12) in the fabrication of the interferometric modulator may also be conducted in accordance with the method 1200, e.g., deposition of a first reflective layer over the substrate, deposition of a sacrificial layer over the substrate and/or over the first reflective layer, deposition of a second reflective layer over the sacrificial layer, removal of the sacrificial layer to form a cavity positioned between the first reflective layer and the second reflective layer, and/or removal of the sacrificial layer to form a cavity positioned between the first reflective layer and the moveable layer.

The methods 1100, 1200 discussed above make reference in certain embodiments to forming bonds to the support structure 18 of an interferometric modulator of the general type shown in FIG. 7A. It will be understood that the illustrated methods may also be employed to form similar bonds between the support structures and the layers to which the support structures are attached in other types of interferometric modulators, including but not limited to the interferometric modulators illustrated in FIGS. 7B-E. For example, in an embodiment (not illustrated in FIG. 10), the method 1200 is employed to form a bond between a support structure and a moveable layer, and a reflective surface is formed that is suspended from the moveable layer, e.g., in the general manner illustrated in FIG. 7C. It will be appreciated that the methods 1100, 1200 may each be carried out individually, or combined into a single method. For example, the method 1100 may be conducted to form a bond between the substrate layer (e.g., the substrate 20 or the optical stack 16) and the support structure 18; the method 1200 may be conducted to form a bond between the support structure 18 and the moveable layer 14; and/or the methods 1100 and 1200 may be carried out together, e.g., to form bonds between the support structure 18 and both of the substrate layer (e.g., the substrate 20 or the optical stack 16) and the moveable layer 14.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An electromechanical systems device, comprising:
a substrate layer comprising a first reflective surface formed on a transparent substrate, the first reflective surface being partially transmissive;
a movable layer comprising a second reflective surface, the second reflective surface being spaced from the first reflective surface, the first reflective surface and the second reflective surface defining a cavity therebetween;
a support structure positioned at a side of the cavity and configured to separate at least a portion of the substrate layer from at least a portion of the movable layer; and
a roughened interface configured to increase adhesion between the support structure and the movable layer, the roughened interface comprising
an etched surface of the support structure, and
a surface of the movable layer connected to the etched surface of the support structure.

2. The device of claim 1, wherein the first reflective surface and the second reflective surface define an interferometric cavity.

3. The device of claim 1, wherein the second reflective surface is suspended from the movable layer.

4. The device of claim 1, further comprising an adhesive layer disposed on the etched surface of the support structure.

5. The device of claim 4, wherein the adhesive layer comprises aluminum.

6. The device of claim 4, wherein the adhesive layer is connected to the etched surface of the support structure and the movable layer.

7. A display device comprising the electromechanical device of claim 1.

8. The display device of claim 7, further comprising:
a display;
a processor that is in electrical communication with the display, the processor being configured to process image data;
a memory device in electrical communication with the processor.

9. The display device of claim 8, further comprising:
a driver circuit configured to send at least one signal to the display.

10. The display device of claim 9, further comprising:
a controller configured to send at least a portion of the image data to the driver circuit.

11. The display device of claim 8, further comprising:
an image source module configured to send the image data to the processor.

12. The display device of claim 11, wherein the image source module comprises at least one of a receiver, transceiver, and transmitter.

13. The display device of claim 8, further comprising:
an input device configured to receive input data and to communicate the input data to the processor.

14. An electromechanical device comprising:
first means for reflecting light, the first reflecting means being partially transmissive;
second means for reflecting light, the second reflecting means being movable and spaced apart from the first reflecting means;
means for supporting the first reflecting means over the second reflecting means; and
means for bonding the support means to at least one of the first reflecting means and the second reflecting means, the bonding means comprising an etched roughened surface of the support means, the etched roughened surface being configured to increase adhesion between the supporting means and at least one of the first reflecting means and the second reflecting means.

15. The electromechanical device of claim 14, wherein the first reflecting means comprises a fixed layer.

16. The electromechanical device of claim 15, wherein the fixed layer comprises a first reflective surface formed on a substrate.

17. The electromechanical device of claim 16, wherein the substrate is transparent.

18. The electromechanical device of claim 14, wherein first reflecting means and the second reflecting means define an interferometric cavity.

19. The electromechanical device of claim 14, wherein the second reflecting means comprises a movable layer.

20. The electromechanical device of claim 14, wherein the bonding means further comprises an adhesive.

21. The electromechanical device of claim 20, wherein the adhesive comprises aluminum.

22. The electromechanical device of claim 14, wherein the bonding means further comprises a roughened surface of the first reflecting means.

23. An electromechanical device comprising:
first means for reflecting light, the first reflecting means being partially transmissive;
second means for reflecting light, the second reflecting means being movable and spaced apart from the first reflecting means;
means for supporting the first reflecting means over the second reflecting means; and
means for bonding the support means to at least one of the first reflecting means and the second reflecting means, the bonding means being configured to increase adhesion between the supporting means and at least one of the first reflecting means and the second reflecting means, wherein the bonding means comprises a roughened surface of the second reflecting means.

24. The electromechanical device of claim 14, wherein the support means comprises a post.

25. An electromechanical device comprising:
a substrate layer comprising a first reflective surface formed on a transparent substrate, the first reflective surface being partially transmissive, the substrate layer comprising at least one etched roughened surface;
a movable layer comprising a second reflective surface, the first reflective surface and the second reflective surface defining a cavity therebetween;
a support structure positioned at a side of the cavity and disposed on the at least one etched roughened surface of the substrate layer, the support structure configured to separate at least a portion of the substrate layer from at least a portion of the movable layer.

26. The device of claim 25, further comprising an adhesive disposed on the at least one roughened surface of the substrate layer between the substrate layer and the support structure.

27. The device of claim 26, wherein the adhesive is between the support structure and the transparent substrate.

28. The device of claim 26, wherein the adhesive is between the support structure and the first reflective surface.

29. The device of claim 25, wherein the support structure comprises a second etched roughened surface.

30. The device of claim 29, wherein the second etched roughened surface is connected to a portion of the movable layer.

31. The device of claim 30, further comprising an adhesive connecting the second etched roughened surface of the support structure and the movable layer.

* * * * *